United States Patent
Tanti et al.

(10) Patent No.: US 10,810,662 B1
(45) Date of Patent: Oct. 20, 2020

(54) UTILIZING TIME-SERIES TABLES FOR TRACKING ACCUMULATING VALUES

(71) Applicant: Amazon Technologies, Inc., Seattle, WA (US)

(72) Inventors: Aditya Tanti, Bangalore (IN); Guy Bialostocki, Seattle, WA (US); Chelsea Celest Krueger, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 649 days.

(21) Appl. No.: 15/348,411

(22) Filed: Nov. 10, 2016

(51) Int. Cl.
  *G06F 16/23* (2019.01)
  *G06Q 40/02* (2012.01)
  *G06F 16/11* (2019.01)
  *G06F 16/28* (2019.01)
  *G06F 16/22* (2019.01)

(52) U.S. Cl.
  CPC .......... *G06Q 40/02* (2013.01); *G06F 16/113* (2019.01); *G06F 16/2282* (2019.01); *G06F 16/2322* (2019.01); *G06F 16/282* (2019.01)

(58) Field of Classification Search
  CPC ......... G06F 17/30073; G06F 17/30339; G06F 17/30353; G06F 16/2282; G06F 16/282; G06Q 40/02
  See application file for complete search history.

(56) References Cited

U.S. PATENT DOCUMENTS

| | | | |
|---|---|---|---|
| 7,873,556 B1 * | 1/2011 | Dolan | G06Q 20/10 705/30 |
| 9,128,965 B1 * | 9/2015 | Yanacek | G06F 16/955 |
| 2012/0271804 A1 * | 10/2012 | Hirose | G06F 16/2343 707/704 |
| 2016/0041886 A1 * | 2/2016 | Zhu | G06F 16/27 714/15 |
| 2017/0228405 A1 * | 8/2017 | Ward | G06F 16/2474 |

* cited by examiner

*Primary Examiner* — Loc Tran
(74) *Attorney, Agent, or Firm* — Thomas Horstemeyer, LLP (57) ABSTRACT

A balance tracker application is disclosed that can track a numerical value, an accumulating value, or any other balance. Time-series tables are employed to store a transaction history. The time-series tables facilitate higher transaction throughput and reduces the likelihood that a managed database will partition tables storing transaction data.

20 Claims, 7 Drawing Sheets

Time Series Table N 317a

| CHANGE | CURRENT VALUE | RO | CLOSE OUT |
|---|---|---|---|
| -10 | 100 | 10 | N |
| 10 | 110 | 11 | N |
| 10 | 120 | 12 | N |
| -70 | 50 | 13 | N |
| N/A | 50 | 14 | Y |

305 → (row with -70)
301 → (row with N/A)

○
○
○

Time Series Table N+1 317b

| CHANGE | CURRENT VALUE | RO | CLOSE OUT |
|---|---|---|---|
| 10 | 60 | 15 | N |

303 → (row with 10)

UTILIZING TIME-SERIES TABLES FOR TRACKING ACCUMULATING VALUES

BACKGROUND

Accurate tracking of updates to accumulating values or other types of values can be important in many contexts. For example, an account balance associated with a user in a financial institution is an extremely important value that must be accurately tracked. Providing high throughput capability is also an important consideration in environments in which transaction volume is high. In some database environments, as the size of a table increases, transaction throughput might suffer as the database attempts to scale up to account for the increasing amount of data by partitioning a table into multiple tables. Additionally, if a particular user requires a historical account of account activity for their account, a significant strain on system resources might result as a system searches the database for transactions relating to the user account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application is directed to processing transactions to update a stored or accumulating value, such as an account balance. Embodiments of the disclosure can facilitate high volume updates to a value in a table. Embodiments of the disclosure can also facilitate storage of updates to values in time-series tables. Time series tables can allow for storage of a transaction history so that transactions are separated into tables based upon when the respective transactions occurred. For example, all updates to values for a particular week or 7-day time period can be stored in a particular table in a data store. Then, updates to values for the following 7-day time period can be stored in another table in the data store, and so on.

Time-series tables can be useful in scenarios where locating transactions based upon their date or timestamp is needed. For example, users of a system might require retrieval of transactions associated with their account for a particular calendar time period, such as a quarter or a calendar year. Accordingly, arranging transactions into time-series tables can make it easier for a search to produce the transactions for the requested calendar period. Additionally, arranging transaction history into time-series tables can also help a system scale as the number of transactions or updates to the value increases over time. Because transactions are split into multiple tables according to a timestamp of the transactions, the table sizes can be kept smaller, which can allow a database system managing the tables to provide higher transaction throughput in many contexts.

In an environment in which multiple clients might make updates to a value using time-series tables, there remains a risk that clients might write a transaction to the wrong time-series table depending upon the status of a client's system clock. For example, in a system that uses weekly time-series tables, a first client might have a system clock that is slow, and a second client might have an accurate system clock. In this scenario, as the current time progresses from one week to the next, the first client may write updates to a value to the wrong time-series table while the second client might write updates to the correct time-series table. This scenario can put the accuracy of the value or accumulating balance in jeopardy.

Additionally, if the table or tables in which values are housed are in a managed database service, as the table sizes reach a certain threshold, transaction throughput might drop. In this scenario, some managed database services, as table sizes grow, split tables into more than one table behind the scenes even though logically, the table has not been split by the client of the managed database service. Additionally, as table sizes grow, transaction throughput can drop. This can be the case in a relational or a non-relational managed database service.

Figure 1:
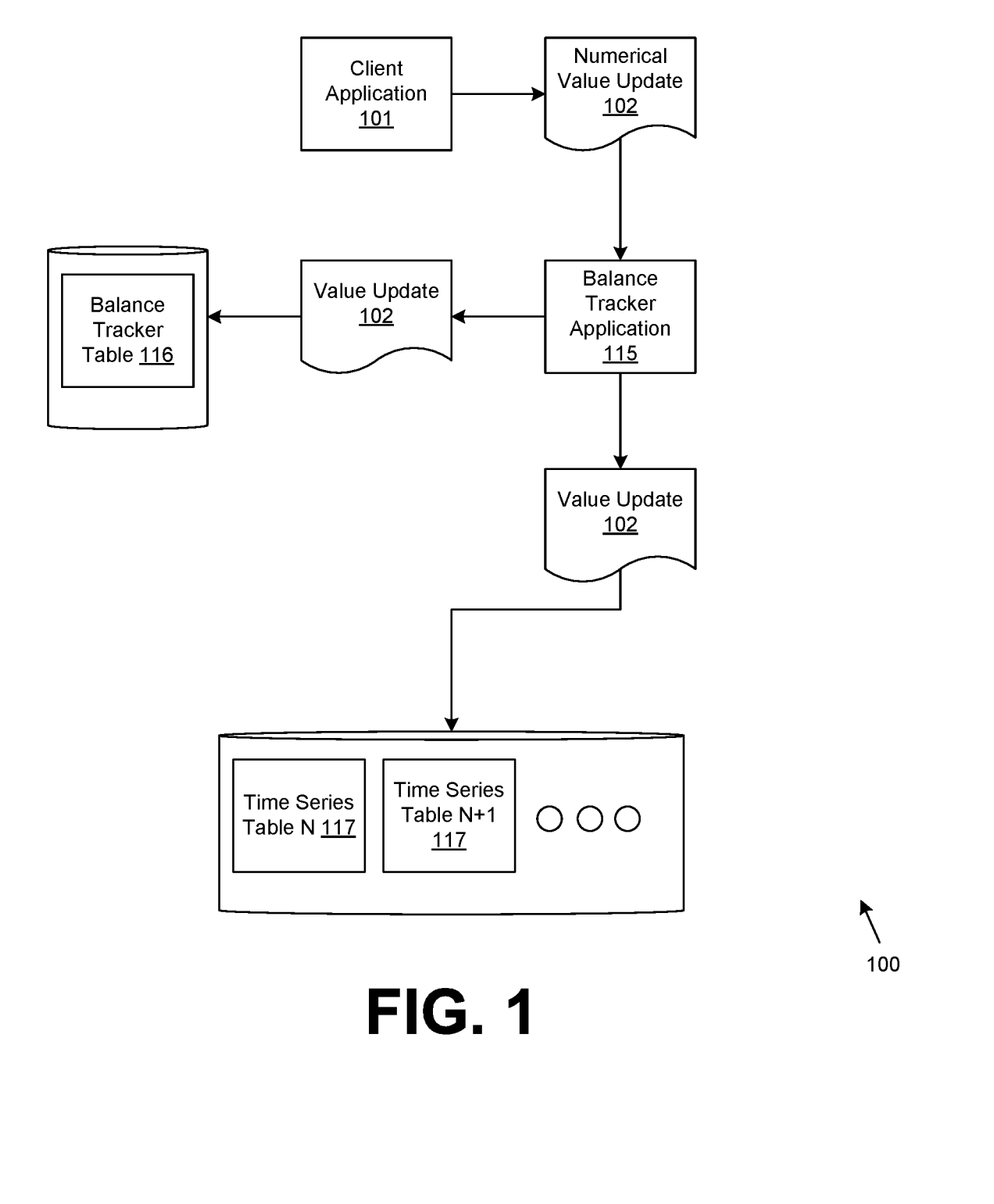
FIG. 1 is a pictorial diagram illustrating one approach to utilizing time-series tables according to various embodiments.

Reference is now made to FIG. 1, which illustrates an example of a scenario 100 according to one example of the disclosure. The scenario 100 of FIG. 1 illustrates one approach to storing updates to a value into time-series tables that mitigates some of the issue that are mentioned above. In FIG. 1, a client application 101 can submit a value update 102 to a balance tracker application 115. The value update 102 can be a debit or a deposit to an accumulating value that is associated with a user account. The balance tracker application 115 can provide a front-end with which client applications 101 can interact. The client application 101 can include any system or device that might make updates to a stored value or accumulating value. For example, the client application 101 can include an e-commerce system that makes updates to a user's account balance as the user makes purchases, debits, withdrawals, or deposits. The user's account balance might correspond to an amount of real or virtual currency or any other amount that is desired to be tracked. For example, the account balance might be a points or miles balance associated with a particular type of user account rather than real or virtual currency.

The balance tracker application 115 can obtain the value update 102 from the client application 101. In some embodiments, the balance tracker application 115 can perform an idempotency check on the request to update the stored value. The idempotency check can be performed to ensure that the value update 102 was not previously received and processed by the balance tracker application 115. In other words, the idempotency check is performed to ensure that duplicate requests are not processed more than once, or to ensure transaction idempotency.

The balance tracker application 115 can also asynchronously archive the value update 102 in a time-series table 117 that is associated with a timestamp of the value update 102. The timestamp can be generated by the client application 101 submitting the value update 102 or by the balance tracker application 115. In some examples, the balance tracker application 115 can tag the account within the balance tracker table 116 that is linked to the stored value update for asynchronous archival into a time-series table 117. In this scenario, the balance tracker application 115 can perform a cleanup process that is asynchronous from the process in which value updates 102 are received from the client application 101 and stored in the balance tracker table 116 in which entries in the balance tracker table 116 that have not yet been archived can be stored into an appropriate time-series table 117.

In other examples, the balance tracker application 115 can cache the value update 102 in a cache and archive the value update 102 into a time-series table 117. The balance tracker application 115 might also store the value update 102 into a queue of various value updates 102 for archival into an appropriate time-series table 117. In any scenario of this approach, the balance tracker application 115 can select the appropriate time-series table 117 based upon the timestamp of the value update 102. In one example, the time-series table 117 can be segmented such that all value updates 102 received in a particular window of time, such as a day, a week, a year, etc., are archived into a particular time-series table 117. For example, a first time-series table 117 can be associated with the $1^{st}$ week of a calendar year, and a second time-series table 117 can be associated with the $2^{nd}$ week of the calendar year, and so on.

After performing an idempotency check, the balance tracker application 115 can store the value update 102 in a balance tracker table 116. The balance tracker table 116 can store the current value of a particular account balance or stored value. In one example, data from the value update 102 and/or a preexisting entry for the account in the balance tracker table 116 is extracted and stored in the balance tracker table 116. The data that is extracted can include the current balance of the account (after the update is applied), the amount by which the request has updated the balance, account identifying information (e.g., an account number or other identifier), and a running order associated with the update. In one example, changes to a particular account within the balance tracker table 116 can be associated with a running order, which is a sequential identifier that is incremented each time a stored value for a particular account is updated. In some examples, the running order can be a timestamp or a numerical value that is not incremented sequentially. The running order can be used to facilitate transaction idempotence along with an idempotency key that is generated for the value update 102, as is described in further detail below. Alternative approaches to employing time-series tables to track a stored value, accumulating value, or other type of balance are also described herein.

Figure 2A:
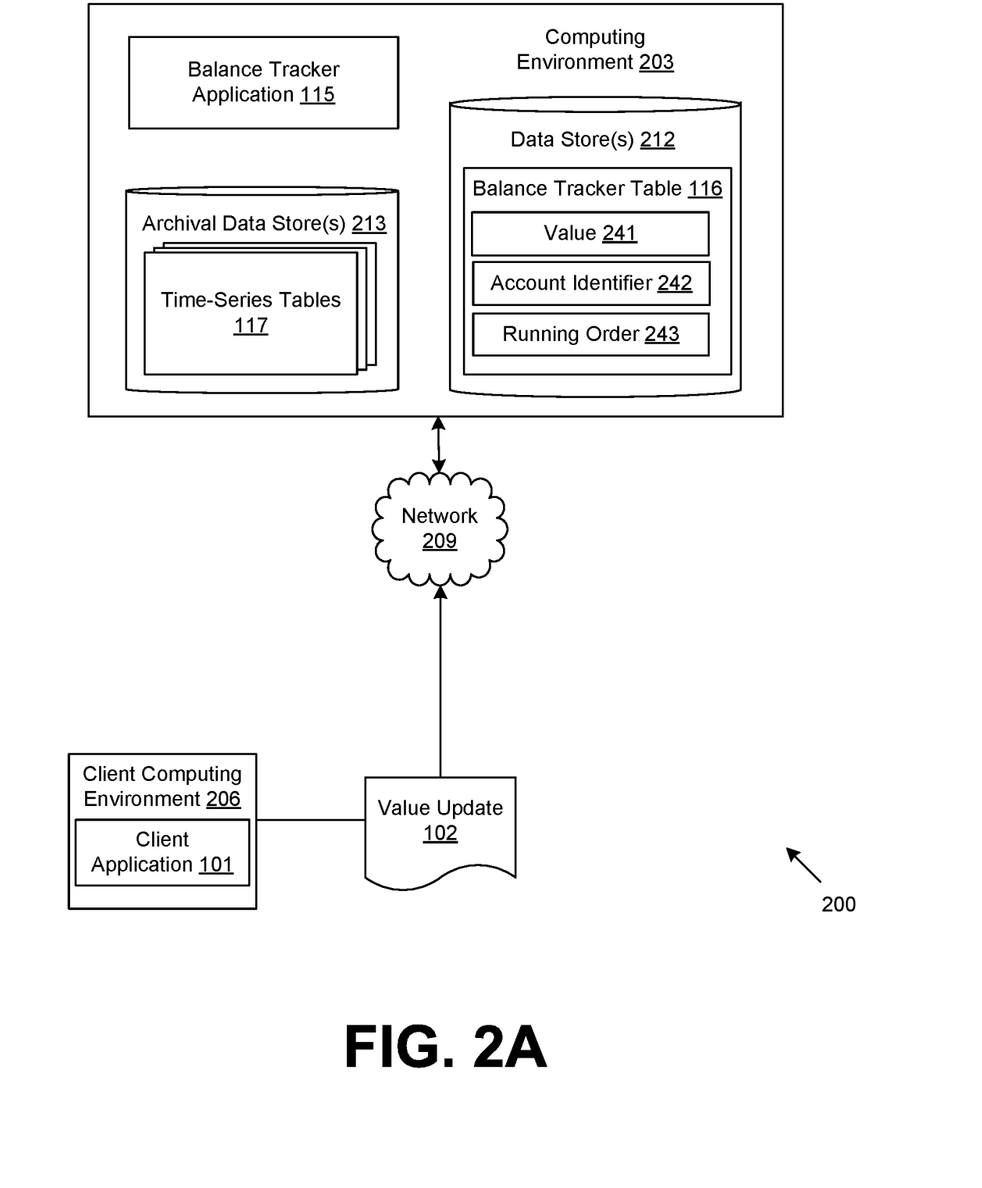
FIGS. 2A-2B are block diagrams of a networked environment according to various embodiments of the present disclosure.

With reference to FIG. 2A, shown is a networked environment 200 according to various embodiments. The networked environment 200 includes a computing environment 203 and one or more client computing environment 206 in data communication via a network 209. The network 209 includes, for example, the Internet, intranets, extranets, wide area networks (WANs), local area networks (LANs), wired networks, wireless networks, or other suitable networks, etc., cable networks, satellite networks, or any combination of two or more such networks.

The computing environment 203 and client computing environment 206 can comprise, for example, a server computer or any other system providing computing capability.

Alternatively, the computing environment 203 and client computing environment 206 can employ a plurality of computing devices that can be arranged, for example, in one or more server banks, computer banks, or other arrangements. Such computing devices can be located in a single installation or may be distributed among many different geographical locations. For example, the computing environment 203 and client computing environment 206 can include a plurality of computing devices that together can comprise a hosted computing resource, a grid computing resource, and/or any other distributed computing arrangement. In some cases, the computing environment 203 and client computing environment 206 can correspond to an elastic computing resource where the allotted capacity of processing, network, storage, or other computing-related resources may vary over time.

Various applications and/or other functionality can be executed in the computing environment 203. Also, various data is stored in a data store 212 that is accessible to the computing environment 203. The data store 212 can be representative of a plurality of data stores 212. The data stored in the data store 212, for example, is associated with the operation of the various applications and/or functional entities described below.

The components executed on the computing environment 203, for example, include a balance tracker application 115, and other applications, services, processes, systems, engines, or functionality not discussed in detail herein. The balance tracker application 115 can receive value updates 102 from client application 101, which are requests to update a stored value that is managed by the balance tracker application 115. The balance tracker application 115 can also provide a value of a stored value to requesting clients as well as a transaction history associated with a stored value to requesting clients. The balance tracker application 115 can house stored values for various accounts in a balance tracker table 116 in the data store 212. The balance tracker application 115 can house transaction history, or archive value updates 102, in one or more time-series tables 117 in the archival data store 213. In this sense, the balance tracker application 115 can provide a balance tracking service through an application programming interface (API) that other systems, applications, or services can use to track a numerical value without having to implement their own solution for providing high availability and archival of a transaction history associated with the numerical value.

The data stored in the data store 212 includes, for example, the balance tracker table 116. In some examples, the data store 212 can also include an idempotency table that the system can employ to try and maintain transaction idempotence. The data store 212 can comprise a non-relational or "NoSQL" database that is configured to provide high transaction throughput and scalability. In some examples, a relational database can be used, but in the depicted example, a high performance non-relational database is employed to store the current value of a stored value to provide for high speed reads and writes for the current value of the stored value.

The data stored in the archival data store 213 includes, for example, one or more time-series tables 117. The time-series tables 117 can store a transaction history for historical updates to a stored value in contrast to the balance tracker table 116, which stores the current value of a stored value or those value updates 102 that have not yet been archived into the archival data store 213. In one example, the archival data store 213 can include a lower-cost database that might provide lower transaction throughput than the data store 212. The archival data store 213 might also comprise a lower cost data storage solution than the data store 212. In this way, the current value of a stored value is kept in a high performance data storage solution that allows for fast updating and retrieval, whereas the transaction history can be kept in a lower cost archival data store 213.

The balance tracker table 116 can include entries for various stored values 241 that are tracked by the balance tracker application 115. As noted above, a value 241 can include an account balance, an accumulating value, or a numerical value of any type that can be queried or updated by client applications 101. Each value 241 is associated with an account identifier 242, which uniquely identifies a value 241 with respect to other stored values 241. Each value 241 is also associated with a running order 243. The running order 243 is a sequentially incremented identifier that is incremented each time a value update 102 is received by the balance tracker application 115. The running order 243 facilitates maintaining transaction idempotence in various examples.

The data store 212 also includes an idempotency table in some examples. If an idempotency table is employed, it maintains data that facilitates an idempotency check that can be performed by the balance tracker application 115 prior to updating a value 241 in response to receiving a value update 102. The idempotency table can store, for each value update 102 processed by the balance tracker application 115, an idempotency key and a current running order of the value 241 associated with a particular value update 102. In some examples, the idempotency table can also include a timestamp associated with the value update 102.

The archival data store 213 can include one or more time-series tables 117. The balance tracker application 115 can employ a storage or archival process using time-series tables 117 that are respectively associated with a particular period of time. In other words, value updates 102 associated with a particular time period, such as a day, week, month, etc., are stored in a particular one of the time-series tables 117 that are also associated with the same time period. As one benefit to this strategy, a particular data retention policy can be easily implemented, as time-series tables 117 associated with time periods outside of a data retention period can simply be deleted from the archival data store 213. Additionally, the archival data store 213 can be implemented in a lower cost data storage solution compared to the data store 212 in which the current value of the value 241 is housed.

The client computing environment 206 can execute a client application 101 that can process transactions that result in value updates 102 that are submitted to the balance tracker application 115 via the network 209. In this sense, the client application 101 is any application or service can submits requests to the balance tracker application 115 to update a value 241 or retrieve historical transactions associated with a particular value 241. For example, the client application 101 can comprise an application that processes transactions on behalf of an electronic storefront and can therefore make debits or deposits against a value 241 of a particular account. The client application 101 can also comprise an application that queries the current value of a value 241 to place in a user interface. The client application 101 can also be an application that requests various historical transactions or historical value updates 102 associated with one or more accounts.

The network environment 200 shown in FIG. 2A can be employed to implement the example process discussed with respect to FIG. 1 in which data extracted from value updates 102 is asynchronously written to an appropriate time-series table 117 in the archival data store 213. However, an alternative scheme can also be implemented in which the balance tracker application 115 can write data extracted from value updates 102 directly to an appropriate time-series table 117. Accordingly, reference is now made to FIG. 2B, which depicts an alternative example of a networked environment 250 in which the balance tracker application 115 can be implemented.

Figure 2B:
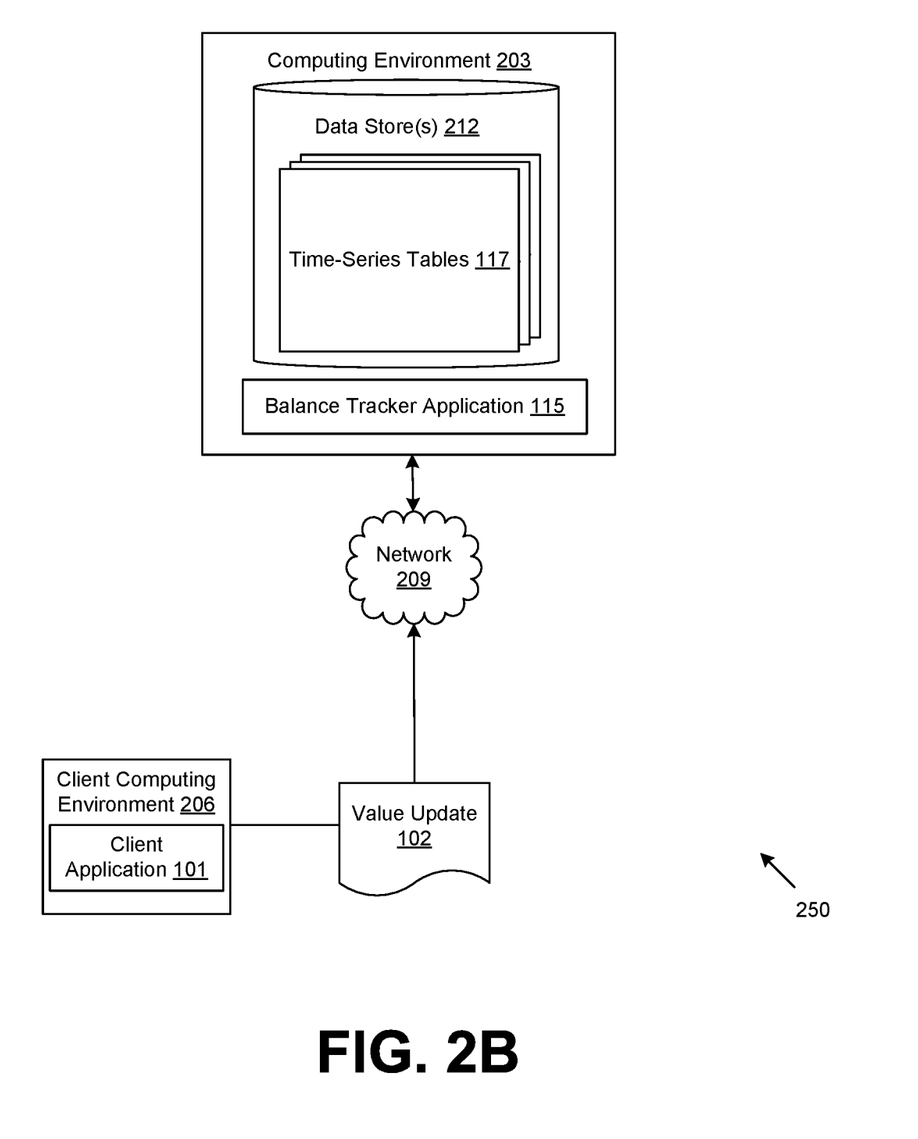

In the example of FIG. 2B, the computing environment 203 does not employ an archival data store 213. Instead, the balance tracker application 115 can write value updates 102 directly to an appropriate time-series table 117 based upon a timestamp associated with the value update 102 submitted to the balance tracker application 115. Upon receiving a value update 102, the balance tracker application 115 can perform an idempotency check using to ensure transaction idempotence. The balance tracker application 115 can then assess which time-series table 117 in the data store 212 is the current time-series table based upon the current time. This assessment can also be made based upon a number of transactions in the current time-series table or the size of the current time-series table. For example, once the number of transactions or updates in a time-series table reaches a specified quantity or data size, the balance tracker application 115 can determine that the time-series table should be closed out. The balance tracker application 115 can then wrote the value update 102 the appropriate time-series table. In one example, the data written to the appropriate time-series table 117 can include the updated value of the value 241, the current running order associated with the value 241, and an amount by which the value 241 was updated by the value update 102.

In one example, the balance tracker application 115 can determine whether the current time-series table 117 should be closed out or expired. In other words, the balance tracker application 115 can determine whether a value update 102 should be written to a new time-series table 117 that corresponds to the next time period. For example, if a value update 102 is received that corresponds to week two, but there have been no value updates 102 written to the time-series table 117 corresponding to week two, the balance tracker application 115 can either generate a new time-series table 117 or write the value update 102 to a new time-series table 117 corresponding to week two while also closing out the time-series table 117 for week one so that no other threads write any additional data to the week one table. The process for closing out a time-series table using this approach is discussed in more detail with respect to FIG. 3.

Figure 3:
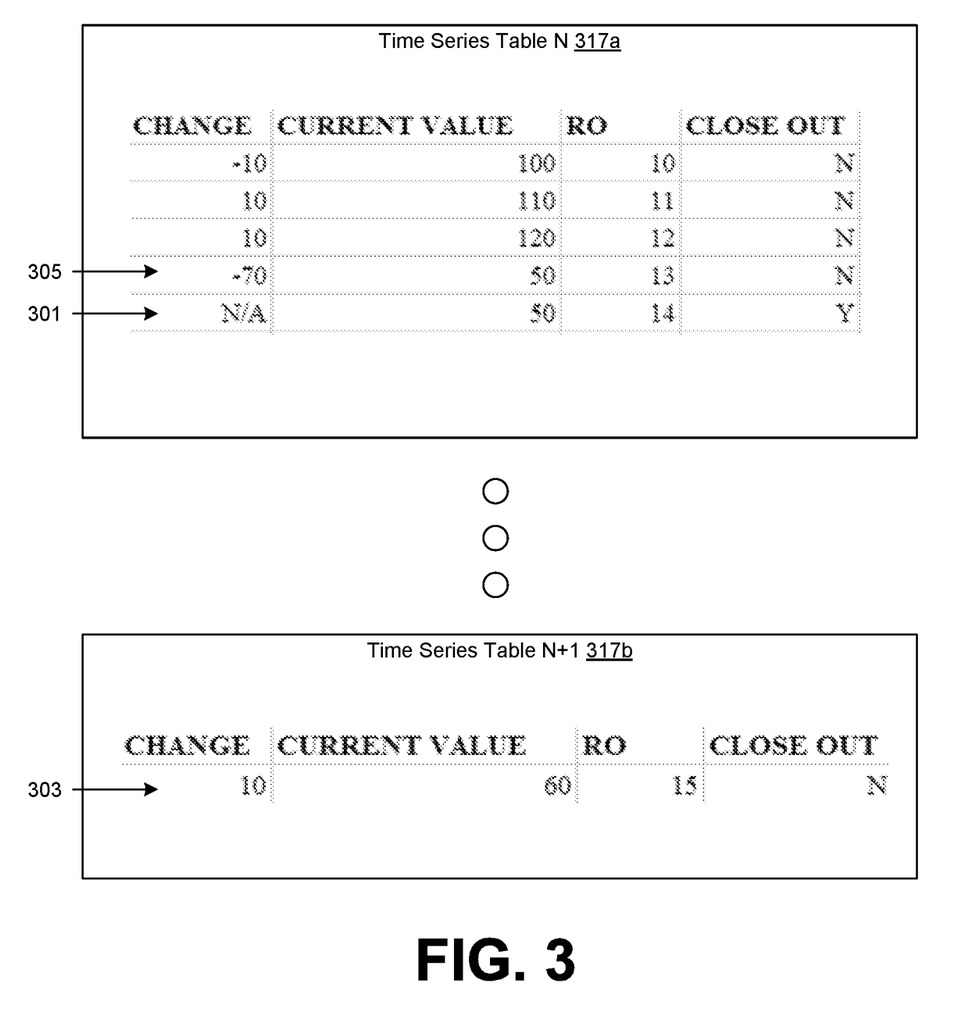
FIG. 3 is a pictorial diagram illustrating one approach to utilizing time-series tables according to various embodiments.

Reference is now made to FIG. 3, which illustrates two time-series tables 117 from the network environment 250 of FIG. 2B and also illustrates how the balance tracker application 115 can generate a close-out row 301 that indicates that a particular time-series table 117 should be closed out or expired. FIG. 3 illustrates an example of operation of the balance tracker application 115 that synchronously writes value updates 102 to the time-series tables 117 instead of relying upon an asynchronous archival process. In the example of FIG. 3, two time-series tables 317a and 317b are depicted. The first time-series table 317a corresponds to a first time period, such as a particular week or 7-day period. The second time-series table 317b corresponds to the next time period, such as the next week or 7-day period.

In the depicted example, a value update 102 corresponding to row 303 is received by the balance tracker application 115. Before making any writes to any time-series table 117, the balance tracker application 115 identifies the current time-series table 117 to which value updates 102 should be written. The balance tracker application 115 can make this determination based upon the timestamp associated with the value update 102 or a timestamp generated by the balance tracker application 115 when the value update 102 is received.

In a multi-threaded or multi-host environment, different devices on which different instances of the balance tracker application 115 is execute might have a system clock that varies, resulting in an error in the timestamp generated by the balance tracker application 115. This error might result in a value update 102 being written to the wrong time-series table 117. Accordingly, by relying upon an instance of the balance tracker application 115 to generate a close-out row 301, this possibility is eliminated.

Accordingly, before writing row 303, the balance tracker application 115 can determine based upon a generated timestamp that time-series table 317a should be closed out or expired. In other words, the balance tracker application 115 can determine that no other value updates 102 should be written to the time-series table 317a and that subsequent value updates 102 should be written to time-series table 317b. Therefore, the balance tracker application 115 can write a close-out row 301 that includes an indication that the time-series table 317a has been closed out and the other instances or threads of the balance tracker application 115 should write value updates 102 to the next time-series table 317b.

The close-out row 301 can include the updated value of the value 241, an amount by which the stored value has been updated, and the running order 243 associated with the value 241. To generate the close-out row 301, the balance tracker application 115 can increment the running order 243 from the previous row 305, or the most recent update to the value 241 and write an indication to the time-series table 317a that the table has been closed out. The balance tracker application 115 can then write its update to the value 241 to time-series table 317b to row 303.

In some examples, the time-series table 317a can be closed out using other mechanisms other than a close-out row 301. In one example, a separate table can be maintained that includes a reference to the current time-series table 317a. In this scenario, the balance tracker application 115 can consult this separate table to identify the current time-series table 317a to identify the current time-series table 317a. In this scenario, if the balance tracker application 115 determines that the current time-series table 317a should be closed out, the balance tracker application 115 can update the reference to the current time-series table 317a to point to the new time-series table 317b.

In some examples, an optimistic locking mechanism can be employed for writes to the time-series tables 317a and 317b. In this scenario, if the balance tracker application 115 determines that the close-out row 301 should be written and another thread writes another value update 102 that includes a change to the value 241, the balance tracker application 115 can make another attempt to write the close-out row 301 by incrementing the running order 243 again and writing an indication that the time-series table 317a is closed out. The balance tracker application 115 can then write its update to the value 241 at row 303. If another thread reads the close-out row 301 and writes an update to time-series table 317b before the balance tracker application 115 can write row 303, the balance tracker application 115 can make another attempt to write row 303 by incrementing the running order 243 again and writing its update to the value 241 to the time-series table 317b.

Figure 4:
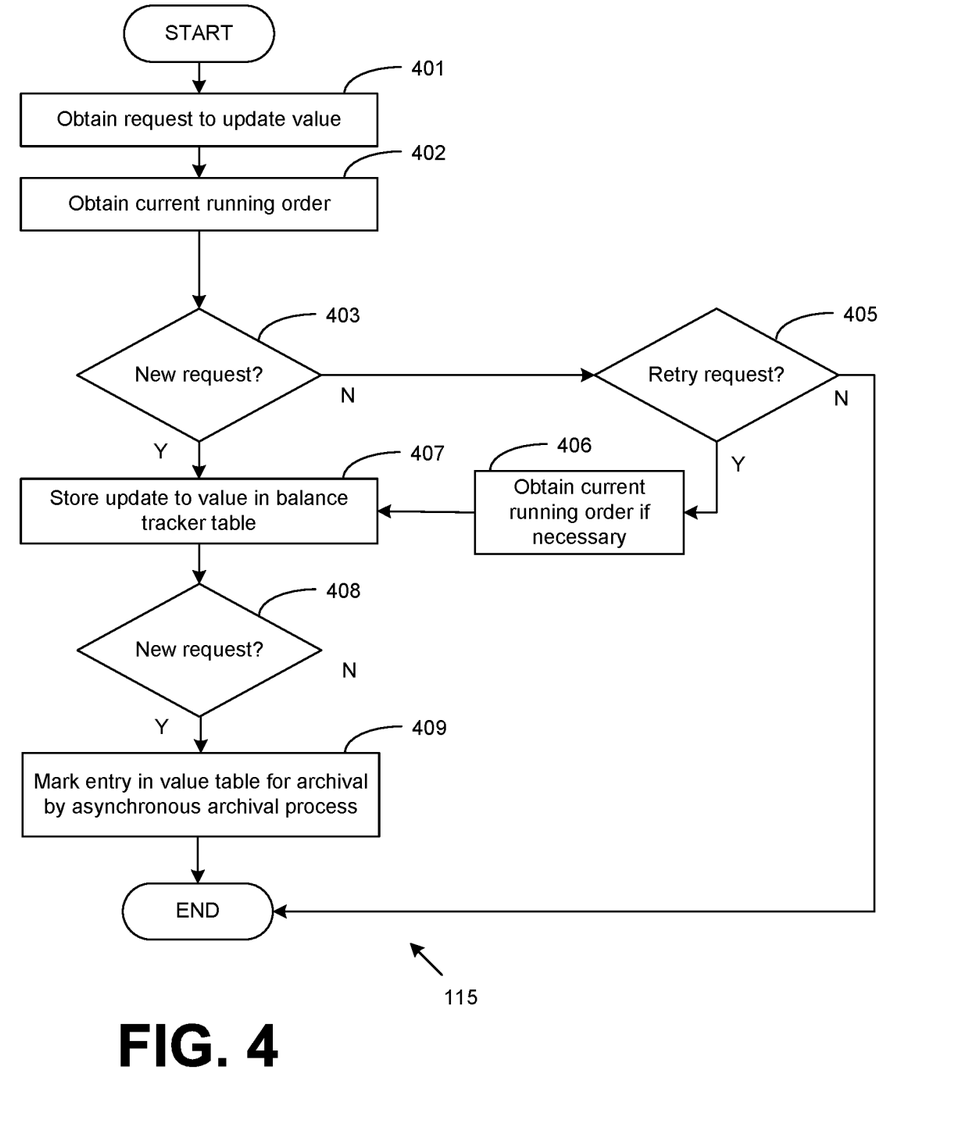
FIGS. 4-5 are flowcharts illustrating examples of functionality implemented as portions of a computing environment in the networked environment of FIGS. 2A-2B according to various embodiments of the present disclosure.

Referring next to FIG. 4, shown is a flowchart that provides one example of the operation of a portion of the balance tracker application 115 according to various embodiments. It is understood that the flowchart of FIG. 4 provides merely an example of the many different types of functional arrangements that may be employed to implement the operation of the portion of the balance tracker application 115 as described herein. As an alternative, the flowchart of FIG. 4 can be viewed as depicting an example of elements of a method implemented in the computing environment 203 according to one or more embodiments. FIG. 4 illustrates an example of how the balance tracker application 115 can asynchronously archive value updates 102 into time-series tables 117.

Beginning with box 401, the balance tracker application 115 can obtain a request to update a value 241, or a value update 102, from a client application 101. At box 402, the balance tracker application 115 can obtain the current running order 243 associated with the value 241. At box 403, the balance tracker application 115 can perform an idempotency check. In other words, the balance tracker application 115 can determine whether the request to update the value 241 is a unique request that has not been previously received in the computing environment 203. To perform an idempotency check, the balance tracker application 115 can generate an idempotency key that is based upon the parameters in the value update 102. In some examples, the idempotency key can be provided by the client application within the value update 102. The idempotency key can be generated using an algorithm that generates a unique key for unique value updates 102 and that repeatedly generates the same key for a given value update 102.

In one example, the idempotency check can be completed by incrementing the current running order 243 and performing a conditional insertion of the idempotency key along with the incremented running order into an idempotency table. If the conditional insertion fails, which means that an entry in the idempotency table with the idempotency key already exists, the balance tracker application 115 can compare the running order stored in the idempotency table with the incremented running order. If the running order stored in the idempotency table is the same as or less than the incremented running order, the balance tracker application 115 can determine that the value update 102 was probably executed by another thread. The balance tracker application 115 can check the current value of the value 241 in the balance tracker table 116 to verify that the value update 102 was executed by the other thread. If it was executed by another thread, meaning the value 241 is updated with the value update 102, the process can determine at box 405 that there is no need to retry the request. Thereafter, the process can end.

If it was not executed by the other thread, the balance tracker application 115 can determine at box 405 that the request should be tried again. Thereafter, the process can proceed to box 406, where the balance tracker application 115 obtains the current running order 237 if necessary. In other words, if the current running order has changed or has been updated by another transaction, the balance tracker application 115 can obtain the updated running order. Additionally, if the current running order has changed, the balance tracker application 115 can update an idempotency table used to maintain transaction idempotence with the current running order so that subsequent attempts to execute the request can obtain this information from the idempotency table. Thereafter, the process can proceed to box 407. If the idempotency check succeeds at box 403, meaning the value update 102 is unique or new request, the balance tracker application 115 can proceed to box 407.

At box 407, the balance tracker application 115 can increment the current running order and store the value update 102 into the balance tracker table 116 along with the incremented running order. In some examples, the running order might not be a sequentially updated value. In these cases, the current running order can be updated according to whatever protocol or convention that is adopted for updating the current running order 243. At box 409, the balance tracker application 115 can mark the value 241 updated by the value update 102 to archival into the archival data store 213 by an asynchronous process. Thereafter, the process can proceed to completion.

Figure 5:
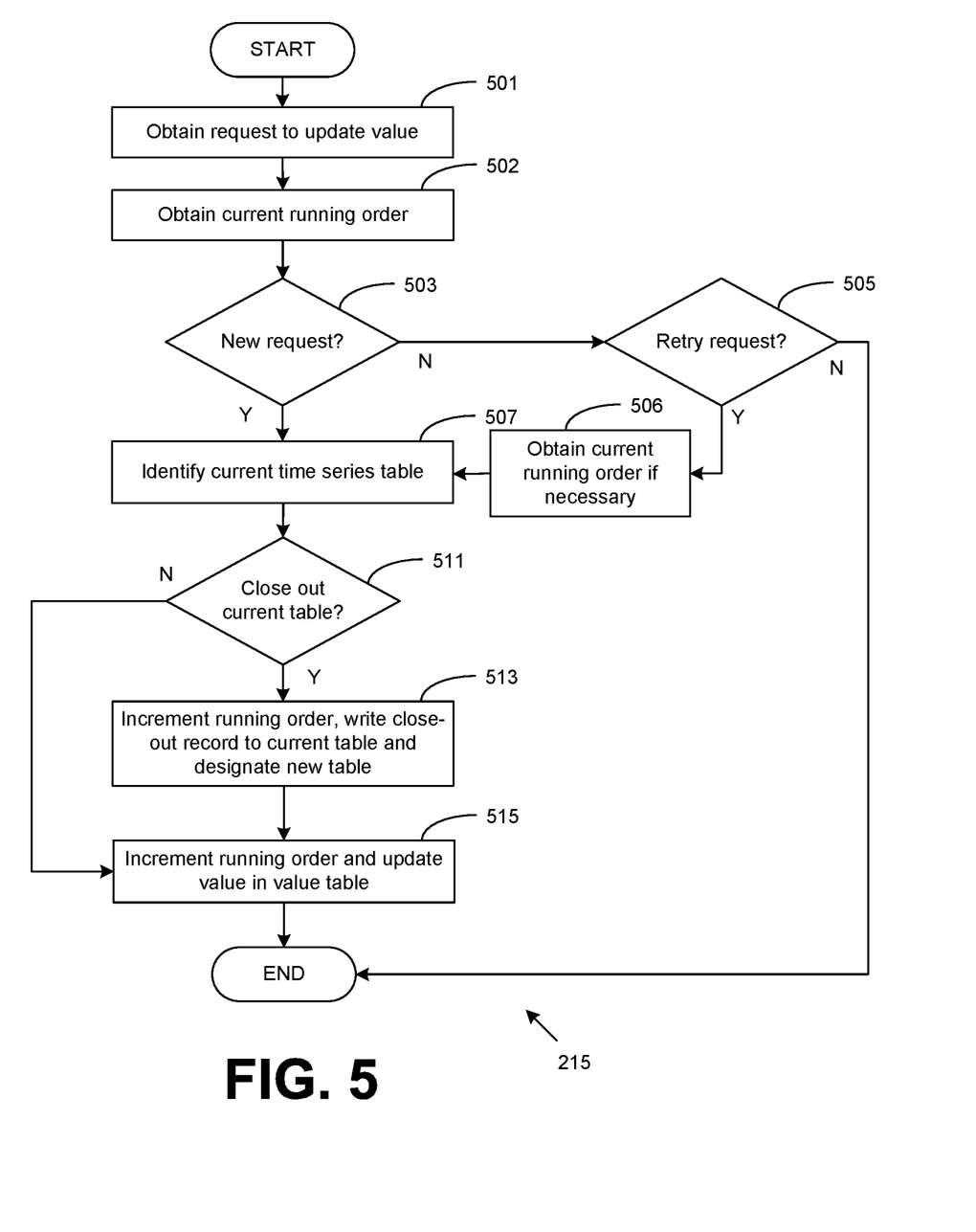

Referring next to FIG. 5, shown is an example of how the balance tracker application 115 can write a value update 102 directly to time-series tables 117. First, at box 501, the balance tracker application 115 can obtain a request to update a value 241, or a value update 102. At box 502, the balance tracker application 115 can obtain the current running order 243 associated with the value 241.

The balance tracker application 115 can obtain the current running order 243 by identifying the current time series table 117 that is associated with the current time. The current running order 243 can be obtained by analyzing the last record in the current time-series table 117 as long as the last record is not a close-out record. If the current time series table 117 includes a close-out record, the balance tracker application 115 can then follow a reference within the close-out record or elsewhere to the next time-series table 117. In this scenario, if a close-out record exists in what the instance of the balance tracker application 115 deems is the current time-series table 117, this means that another instance of the balance tracker application 115 has closed out this time-series table 117 and designated a next time-series table 117. Accordingly, the balance tracker application 115 can then obtain the current running order 243 from the next time-series table 117.

At box 503, the balance tracker application 115 can perform an idempotency check. The process for performing and idempotency check is described in the discussion of FIG. 4. At box 505, if the idempotency check fails but the balance tracker application 115 determines that the value update 102 should be retried, the process proceeds to box 506. Otherwise, the process can proceed from box 505 to completion.

The process for determining whether the value update 102 should be retried can be performed similarly to the process described in connection with FIG. 4. At box 506, the balance tracker application 115 can obtain the current running order and proceed to box 507 if necessary. In other words, if the current running order has changed or has been updated by another transaction, the balance tracker application 115 can obtain the updated running order. Additionally, if the current running order has changed, the balance tracker application 115 can update an idempotency table used to maintain transaction idempotence with the current running order so that subsequent attempts to execute the request can obtain this information from the idempotency table.

At box 507, the balance tracker application 115 can identify the current time-series table 117 that is associated with a current time. In some instances, the current time-series table 117 identified by the instance of the balance tracker application 115 might have a close-out record indicating that the next time-series table 117 should be used. In this scenario, another instance of the balance tracker application 115 may have closed-out the current time-series table 117, in which case the balance tracker application 115 can utilize the next time-series table 117. In this way, the system can ensure that all instances of the balance tracker application 115 are using the same time-series table 117 even if the system clocks of a real or virtual machine on which the balance tracker application 115 is executed vary.

At box 511, the balance tracker application 115 can determine whether the current time-series table 117 should be closed out based upon the current time. If not, the balance tracker application 115 can proceed to box 515, where it increments the current running order and writes the value update 102 to the current time-series table. If the balance tracker application 115 determines that the current time-series table should be closed out, the process proceeds from box 511 to box 513, where the balance tracker application 115 increments the running order and writes a close-out record or row to the current time-series table. Next, at box 515, the balance tracker application 115 increments the incremented running order and writes the value update 102 to the next time-series table 117. Thereafter, the process proceeds to completion.

Figure 6:
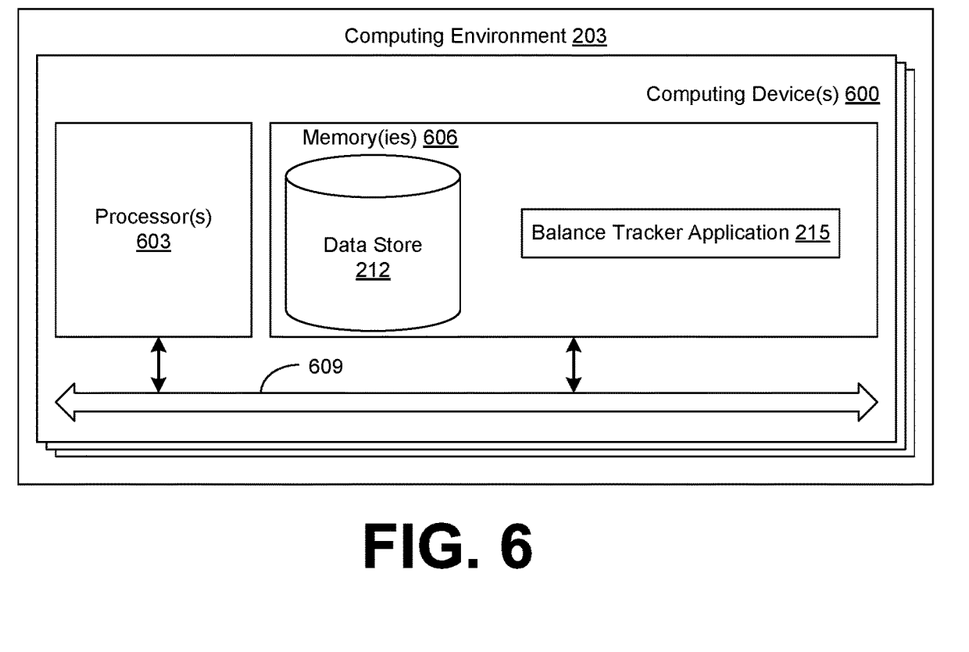
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the balance tracker application 115, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the balance tracker application 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-5 show the functionality and operation of an implementation of portions of the balance tracker application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4-5 show a specific order of execution, it is understood that the order of execution may differ from that which is depicted. For example, the order of execution of two or more blocks may be scrambled relative to the order shown. Also, two or more blocks shown in succession in FIGS. 4-5 may be executed concurrently or with partial concurrence. Further, in some embodiments, one or more of the blocks shown in FIGS. 4-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the balance tracker application 115, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the balance tracker application 115, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   obtaining, via at least one computing device, a request from a client to update a value in a value table in a data store via an application programming interface (API), the value comprising a running balance associated with a user account from among of a plurality of user accounts;
   obtaining, via the at least one computing device, a current running order associated with the value;
   determining, via the at least one computing device, whether the request is a unique request based upon an idem potency table stored in the data store, the idem potency table storing respective idem potency keys for a plurality of values associated with the plurality of user accounts, the idem potency table also storing the current running order;
   in response to determining the request is unique, updating the value in the value table, wherein the value table stores a current value of the value and an amount by which the request updated the value;
   initiating an archival process that asynchronously archives the value table into at least one time-series table that is separate from the value table, wherein the at least one time-series table stores a history of transactions made to the running balance, wherein the archival process:
      identifies a current time;
      identifies a current time-series table based upon the current time; and
      stores the current value and the amount by which the request updated the value into the time-series table.

2. The method of claim 1, the archival process creates the current time-series table in response to a determination that the current time-series table has not yet been created within the data store.

3. The method of claim 1, wherein the archival process is performed asynchronously from updating the value in the value table.

4. The method of claim 1, wherein the archival process identifies the current time-series table from a plurality of time-series tables by identifying a one-week time period within an archival schedule.

5. The method of claim 4, wherein the value table and the idem potency table are stored in a non-relational database and the plurality of time-series tables are stored a separate data store from the non-relational database.

6. A method, comprising:
   obtaining, via at least one computing device, a request to update a value in a data store, the value being stored in a plurality of time-series tables in the data store;
   identifying a current time-series table from among the plurality of time-series table based upon a most recent entry in the plurality of time-series tables;
   identifying a current running order associated with the most recent entry;
   determining that the current time-series table should be closed out;
   in response to determining that the current time-series table should be closed out:
      incrementing the current running order to generate a close-out running order;
      closing out the current time-series table specifying that the current time-series table is expired by writing a close-out row to the current time-series table, the close-out row comprising a current value of the value and an indication that additional entries to the value should be written to a new time-series table;
      writing the update to the value to the new time-series table, the update in the new time-series table comprising a new current running order, wherein the new current running order is generated by incrementing the close-out running order.

7. The method of claim 6, further comprising:
   in response to determining that the current time-series table should not be closed out, generating the new current running order by incrementing the current running order; and
   writing the update to the value to the current time-series table.

8. The method of claim 6, wherein determining that the current time-series be closed out is made based upon a current time, a quantity of entries in the current time-series table, or a size of the current time-series table.

9. The method of claim 8, further comprising generating the new time-series table in the data store in response to determining that the current time-series table should be closed out.

10. The method of claim 6, further comprising obtaining a lock on the current time-series table.

11. The method of claim 6, further comprising:
    generating an idem potency key associated with parameters associated with the request;
    determining whether the request was previously processed based upon the idem potency key and an idempotency table.

12. The method of claim 6, wherein the value comprises a running balance associated with a user account from among a plurality of user accounts.

13. The method of claim 6, wherein the close-out row comprises a current value of the value and an indicator that additional entries should not be written to the current time-series table.

14. The method of claim 6, wherein writing the update to the value to the new time series table further comprises;
    determining whether an entry exists in the new time-series table with the new current running order;
    incrementing the new current running order; and
    writing the update to the value to the new time-series table.

15. The method of claim 6, wherein the update to the value in the new time-series table further comprises an amount by which the value is updated and an updated value of the value.

16. The method of claim 6, wherein the update to the value in the new time-series table further comprises the new current running order.

17. A system, comprising:
    at least one computing device;
    at least one data store in communication with the at least one computing device, the at least one data store housing a balance tracker table associated with a running balance of a plurality of accounts and a plurality of time-series tables storing a history of transactions to the running balance;

an application executable by the at least one computing device, wherein the application, when executed, causes the at least one computing device to at least:

obtain a request to update the running balance of an account in the data store;

obtain a current running order associated with the running balance;

determine whether the request is a unique request based upon an idempotency table stored in the data store, the idempotency table storing respective idem potency keys for a plurality of values associated with the plurality of user accounts, the idem potency table also storing the current running order;

in response to determining the request is unique, store the update to the running balance in the balance tracker table, wherein the update comprises a new value of the running balance and an amount by which the running balance is updated, the balance tracker table further tracking a current value of the running balance;

identify a current time-series table from the plurality of time-series tables associated with the at least one computing device, the plurality of time series tables storing the history of transactions made to the running balance, wherein the balance tracker table is separate from the current time-series table; and asynchronously archive the update to the running balance in the current time-series table.

18. The system of claim 17, wherein the application archives the update to the running balance in the current time-series table asynchronously from storing the update to the running balance in the balance tracker table.

19. The system of claim 17, wherein the application performs an idem potency check on the request to update the running balance based upon an idem potency key stored in an idempotency table.

20. The system of claim 19, wherein the idem potency key is generated from at least one parameter associated with the request and stored in the idem potency table.

* * * * *